Patented Feb. 17, 1931

1,793,030

UNITED STATES PATENT OFFICE

LAMBERT THORP, OF CINCINNATI, OHIO

ISOPROPYL ETHER OF PARA-ACETYL AMINO PHENOL

No Drawing.   Application filed March 1, 1930.   Serial No. 432,558.

This invention relates to the class of organic chemical compounds known as analgesics.

The object of this invention is to provide an organic compound having medicinal value in the treatment of diverse forms of pain, such as headache, neuralgia, rheumatism, etc.

I have found that the isopropyl ether of para-acetyl amino phenol is valuable for medicinal purposes in the treatment of diverse forms of pain.

The isopropyl ether of para-acetyl amino phenol

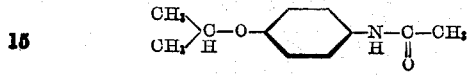

is a white, crystalline compound, slightly soluble in cold water, readily soluble in alcohol or ether, melting at 131–132° C., and displaying analgesic power.

The isopropyl ether of para-acetyl amino phenol may be prepared, for instance, as follows: One part, by weight, of the potassium salt of para-acetyl amino phenol is dissolved in the minimum quantity of alcohol, contained in a suitable vessel, provided with a reflux condenser. One part, by weight, of isopropyl iodide is added, and the solution allowed to remain at 25° C. for one day. The solution is then warmed on the water bath for four or five hours. The excess organic iodide and alcohol is now distilled from the mixture, and, after cooling, sufficient water is added to dissolve the potassium iodide. The impure product is recrystallized one or more times from dilute alcohol with the aid of bone-black until the isopropyl ether of para-acetyl amino phenol is white and shows a melting-point of 131–132° C. and a content of nitrogen of 7.25% criteria which serve to identify the product, the isopropyl ether of para-acetyl amino phenol.

Having described my invention, what I claim is:

As an article of manufacture, the isopropyl ether of para-acetyl amino phenol, being a white, crystalline compound, slightly soluble in cold water, readily soluble in alcohol or ether, melting at 131–132° C., having a content of nitrogen of 7.25%, and displaying analgesic power.

In witness whereof, I hereunto subscribe my name.

LAMBERT THORP.